United States Patent
Geromel et al.

(10) Patent No.: US 8,989,175 B2
(45) Date of Patent: Mar. 24, 2015

(54) ACCESS NODE COMPRISING VOIP CARDS WITH COMMON IP/MAC ADDRESSES

(75) Inventors: Paola Geromel, Asker (NO); Vittoriano Grandi, Genoa (IT); Luca Risso, Genoa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 382 days.

(21) Appl. No.: 13/257,577

(22) PCT Filed: Mar. 18, 2009

(86) PCT No.: PCT/SE2009/050275
§ 371 (c)(1),
(2), (4) Date: Sep. 19, 2011

(87) PCT Pub. No.: WO2010/107346
PCT Pub. Date: Sep. 23, 2010

(65) Prior Publication Data
US 2012/0014383 A1  Jan. 19, 2012

(51) Int. Cl.
*H04L 12/66* (2006.01)
*H04L 29/06* (2006.01)
*H04L 29/12* (2006.01)

(52) U.S. Cl.
CPC ...... *H04L 65/1046* (2013.01); *H04L 29/12028* (2013.01); *H04L 29/12367* (2013.01); *H04L 29/12377* (2013.01); *H04L 61/103* (2013.01); *H04L 61/2514* (2013.01); *H04L 61/2517* (2013.01)
USPC ........................................ 370/352; 455/426.1

(58) Field of Classification Search
CPC .................. H04L 29/12839; H04L 29/12924; H04L 61/2596

USPC ........................................ 370/352; 455/426.1
See application file for complete search history.

(56) References Cited

U.S. PATENT DOCUMENTS

| 7,068,654 | B1 | 6/2006 | Joseph et al. |
| 2002/0016874 | A1* | 2/2002 | Watanuki et al. ............... 710/51 |
| 2003/0118039 | A1 | 6/2003 | Nishi et al. |
| 2003/0227930 | A1 | 12/2003 | Choi et al. |
| 2006/0019655 | A1* | 1/2006 | Peacock ...................... 455/426.1 |
| 2006/0046686 | A1* | 3/2006 | Hawkins et al. ............... 455/403 |

(Continued)

FOREIGN PATENT DOCUMENTS

EP  1 796 311 A1  6/2007

OTHER PUBLICATIONS

PCT Written Opinion of the International Searching Authority issued on Dec. 4, 2009 for International Application No. PCT/SE2009/050275, filed Mar. 18, 2009 (4 pages).

*Primary Examiner* — Andrew Chriss
*Assistant Examiner* — Romani Ohri
(74) *Attorney, Agent, or Firm* — Myers Bigel Sibley & Sajovec, PA

(57) ABSTRACT

Disclosed are methods and arrangements in a VoIP access node for handling downstream and upstream RTP packets associated with an ongoing VoIP call. One common IP address can be assigned to the all of the RTP traffic of an access node instead of assigning one IP address per VoIP card. This may be done by identifying the destination VoIP card based on the destination UDP port number in a received RTP packet. The number of public IP addresses needed for VoIP service may be reduced without increasing the cost of the access node.

24 Claims, 6 Drawing Sheets

(56) References Cited

U.S. PATENT DOCUMENTS

| | | |
|---|---|---|
| 2006/0050705 A1* | 3/2006 | Kim .............................. 370/392 |
| 2006/0291378 A1* | 12/2006 | Brotherston et al. ......... 370/221 |
| 2007/0211698 A1* | 9/2007 | Fuller et al. ................... 370/352 |
| 2008/0212566 A1* | 9/2008 | Kim et al. ...................... 370/352 |
| 2009/0059863 A1* | 3/2009 | Chen et al. ..................... 370/331 |
| 2009/0180444 A1* | 7/2009 | McManus et al. ............. 370/332 |
| 2010/0214956 A1* | 8/2010 | Law et al. ...................... 370/255 |

* cited by examiner

ACCESS NODE COMPRISING VOIP CARDS WITH COMMON IP/MAC ADDRESSES

CROSS REFERENCE TO RELATED APPLICATIONS

This application is a 35 U.S.C. §371 national stage application of PCT International Application No. PCT/SE2009/050275, filed on 18 Mar. 2009, the disclosure and content of which is incorporated by reference herein in its entirety. The above-referenced PCT International Application was published in the English language as International Publication No. WO 2010/107346 A1 on 23 Sep. 2010.

TECHNICAL FIELD

The present invention relates to the area of Voice over IP (VoIP), and especially to the handling of Real-time Transport Protocol (RTP) traffic in an access node. More specifically, the invention relates to methods for handling upstream and downstream RTP packets, as well as to an access node.

BACKGROUND

VoIP is an Internet Protocol (IP) telephony term for a set of facilities used to manage the delivery of voice information over the Internet. VoIP involves sending voice information in digital form in discrete packets using IP rather than by using the traditional circuit-committed protocols of the public switched telephone network (PSTN). In addition to IP, VoIP uses RTP to help ensure that packets get delivered in a timely way. RTP defines a standardized packet format for delivering audio and video over the Internet.

As VoIP is a time-sensitive application, it uses the User Datagram Protocol (UDP) as network protocol on Internet. For VoIP, dropping packets is preferable to using delayed packets, and with the UDP, computer applications can send messages, also known as datagrams, to other hosts on an IP network without requiring prior communications to set up special transmission channels or data paths. The UDP uses a simple transmission model without implicit hand-shaking dialogues for guaranteeing reliability, ordering, or data integrity. Thus, the UDP provides an unreliable service, and datagrams may arrive out of order, appear duplicated, or go missing without notice. The UDP assumes that error checking and correction is either not necessary or performed in the application, avoiding the overhead of such processing at the network interface level.

The UDP provides one service that is not provided by the IP layer, i.e. port numbers to help distinguish different user requests. A port number is a 16-bit integer that is put in the header appended to a message unit, and this port number is passed physically between the transport layer and the IP layer, and forwarded. The combination of an IP address and a port number is referred to as a socket. A socket binds the application to service ports that function as the endpoints of data transmission, and a UDP application, such as VoIP, uses datagram sockets to establish host-to-host communications.

A VoIP system can interface with the traditional PSTN to allow for transparent phone communications worldwide. Equipment in the access network—the access node—provides the end user access and can support VoIP with media conversion from analogue voice signals to IP packets.

One example of a VoIP access node architecture is illustrated in FIG. 1. Chipsets available on the market allow limited modularity for media conversion. Therefore, in order for an access node 101 to serve a plurality of users, the access node 101 must be designed with several chipsets or VoIP cards 102, where each VoIP card 102 performs the media conversion for a limited number of users, typically 24, 32, 48 or 64 users. Media conversion is performed on the VoIP cards 102 through Digital Signal Processors (DSP) 103, converting analogue voice signals on the plain old telephony service (POTS) lines 109 into digitized pulse-code modulation samples. The voice traffic is then transmitted in RTP packets over IP. The voice traffic over IP will henceforth be referred to as RTP traffic.

The VoIP cards 102 typically also host the Access Gateway (AGW) application 104, which handles VoIP signaling flows (call setup, call termination) using e.g. the Session Initiation Protocol (SIP) or H.248 signaling protocols. The VoIP signaling traffic 105 and the RTP traffic 106 are then aggregated by means of a controller card 107, which is based on an Ethernet switch 108 for traffic forwarding. This architecture can be defined as distributed, since both the media conversion and the AGW application are implemented on each VoIP card.

In a distributed architecture as in FIG. 1, both the RTP traffic 106 and the VoIP signaling traffic 105 are generated and terminated on each VoIP card 102. This implies that in upstream direction, i.e. the direction from the VoIP card 102 towards the IP network 110, the RTP—and the signaling packets are generated on each VoIP card. The packets have as Source IP address the IP address of the VoIP card on which they are generated, and as Source Media Access Control (MAC) address the MAC address of that same VoIP card. Those IP and MAC addresses will be used in downstream direction, i.e. the direction from the IP network 110 towards the VoIP card 102, to reach that same VoIP card. For both directions the controller card 107 bridges packets based on the MAC addresses, i.e. it forwards the packets without altering the packet content.

The main problem of the distributed architecture is that it requires a plurality of public IP addresses (one for each VoIP card). This is unacceptable as the VoIP service becomes more widespread, as public IP addresses are a scarce resource.

FIG. 2 illustrates an architecture with an AGW application 104 centralized on the controller card 107, while keeping the distributed DSPs 103 on the VoIP cards 102. In this architecture, the number of IP addresses for the signaling traffic 105 is automatically reduced to one. However, this does not solve the problem of the large amount of IP addresses, as there will still be a need for one IP address per VoIP card for the RTP traffic 106.

One solution to the problem of the high number of IP addresses is to implement Network Address Translation (NAT) on the controller card. In computer networking, NAT is the process of modifying network address information in datagram packet headers while in transit across a traffic routing device, for the purpose of remapping a given address space into another. NAT involves re-writing the source and/or destination IP addresses and usually also the port numbers of IP packets. Checksums must also be rewritten to take account of the changes. As the NAT implementation requires modification of the IP packets, a more powerful processor is needed on the controller card, leading to higher costs of the controller card itself.

There is thus a need to provide a cost efficient VoIP access node, which requires a reduced number of IP addresses.

SUMMARY

The object of the present invention is to address the problems outlined above, and this object and others are achieved by the methods and the arrangements according to the appended independent claims, and by the embodiments according to the dependent claims.

The present invention relates to methods and arrangements that enable the reduction of the number of IP addresses of a VoIP access node to at the most two: one IP address for the signaling traffic and one IP address for RTP traffic. By centralizing the AGW application on the controller card, the IP addresses of the signaling traffic are reduced to one. All the VoIP cards of the access node are given one common MAC address, making it possible to assign one IP address for the RTP traffic. This implies that the identification of the correct destination VoIP card to forward the downstream RTP packets to will be based on the destination UDP port number comprised in the packet.

Thus in accordance with a first aspect of the present invention, an access node adapted to handle downstream RTP packets associated with an ongoing VoIP call is provided. The access node comprises a controller card connectable to an IP network, and a first and at least one additional VoIP card connectable to the controller card. The first VoIP card is the destination of the RTP packets, and is configured with at least one UDP port number. The VoIP cards are assigned a common IP address and a common MAC address for the RTP packets, and the access node comprises means for receiving a packet from the IP network. The RTP packet comprises the common IP address as a destination IP address, the common MAC address as a destination MAC address, and a destination UDP port number. The access node also comprises means for identifying a destination VoIP card based only on the destination UDP port number.

In accordance with a second aspect of the present invention, a method in an access node for handling downstream RTP packets associated with an ongoing VoIP call is provided. The access node comprises a controller card connected to an IP network, and a first and at least one additional VoIP card connected to the controller card. The first VoIP card is the destination of the RTP packets, and is configured with at least one UDP port number. The method comprises the steps of assigning a common IP address and a common MAC address for the RTP packets to said VoIP cards, and of receiving a packet from the IP network. The packet comprises the common IP address as a destination IP address, the common MAC address as a destination MAC address, and a destination UDP port number. The method also comprises the step of identifying a destination VoIP card based only on the destination UDP port number.

In accordance with a third aspect of the present invention, a method in an access node for handling upstream RTP packets associated with an ongoing VoIP call is provided. The access node comprises a controller card connected to an IP network, and a first and at least one additional VoIP card connected to the controller card. The first VoIP card is the origin of the RTP packets and the VoIP cards have been assigned a common IP address and a common MAC address for the RTP packets. The method comprises the steps of generating a packet comprising the common IP address as a source IP address and the common MAC address as a source MAC address, and of forwarding the generated packet to the IP network. The steps are performed by the first VoIP card.

An advantage of embodiments of the present invention is that the number of public IP addresses needed for the VoIP service within the access network is reduced, while keeping the system scalability through the distributed DSP architecture.

Another advantage of embodiments of the present invention is the cost efficiency, as it is possible to use a low cost commercial Ethernet switch on the controller card to forward RTP traffic, and as there is no need for a powerful and expensive processor on the controller card.

Still another advantage of embodiments of the present invention is that it is possible to upgrade from a conventional distributed architecture to the centralized architecture of the invention without any hardware upgrade.

DETAILED DESCRIPTION

Figure 1:
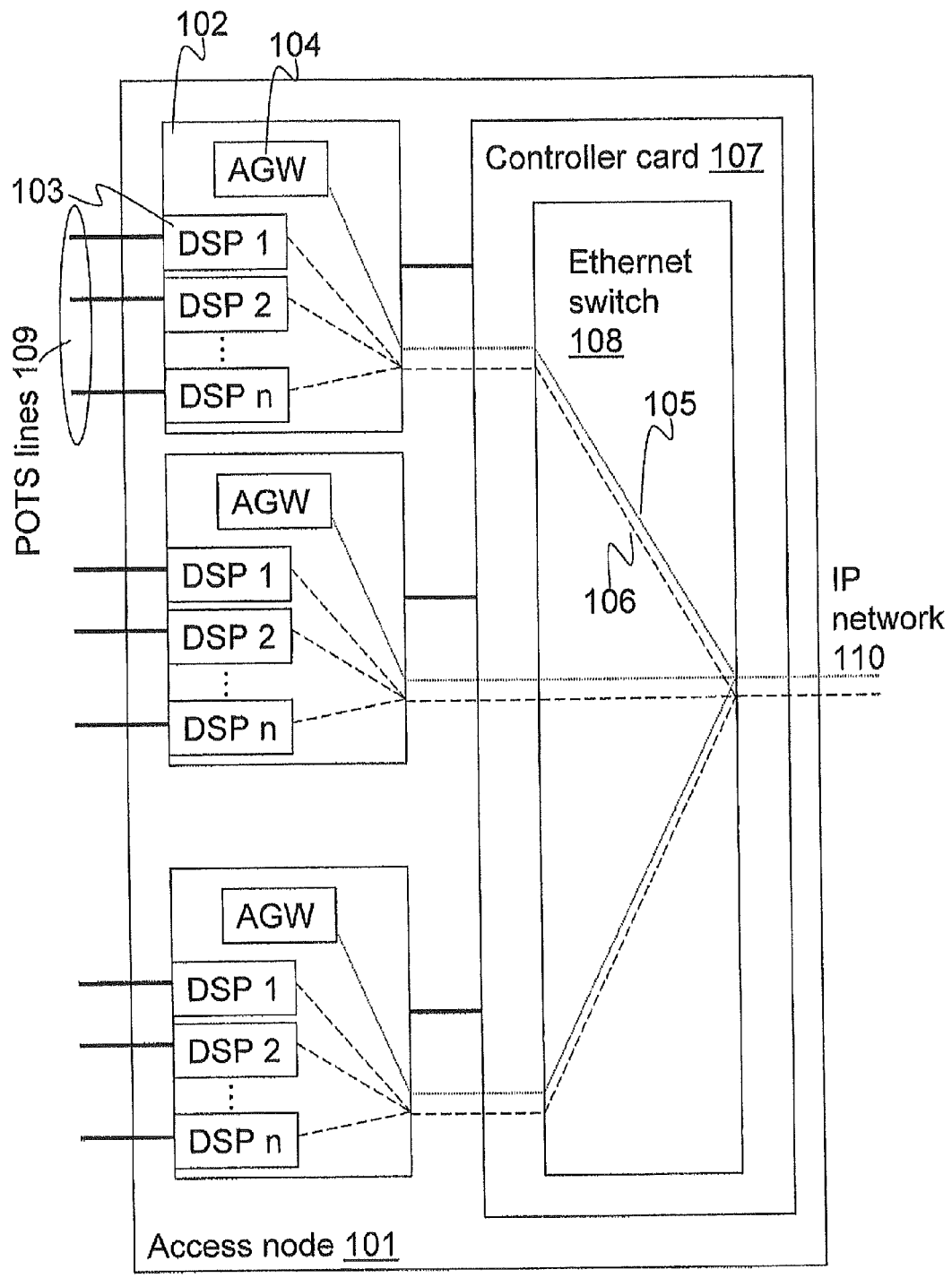
FIG. 1 illustrates schematically an access node with a distributed architecture according to prior art.
Figure 2:
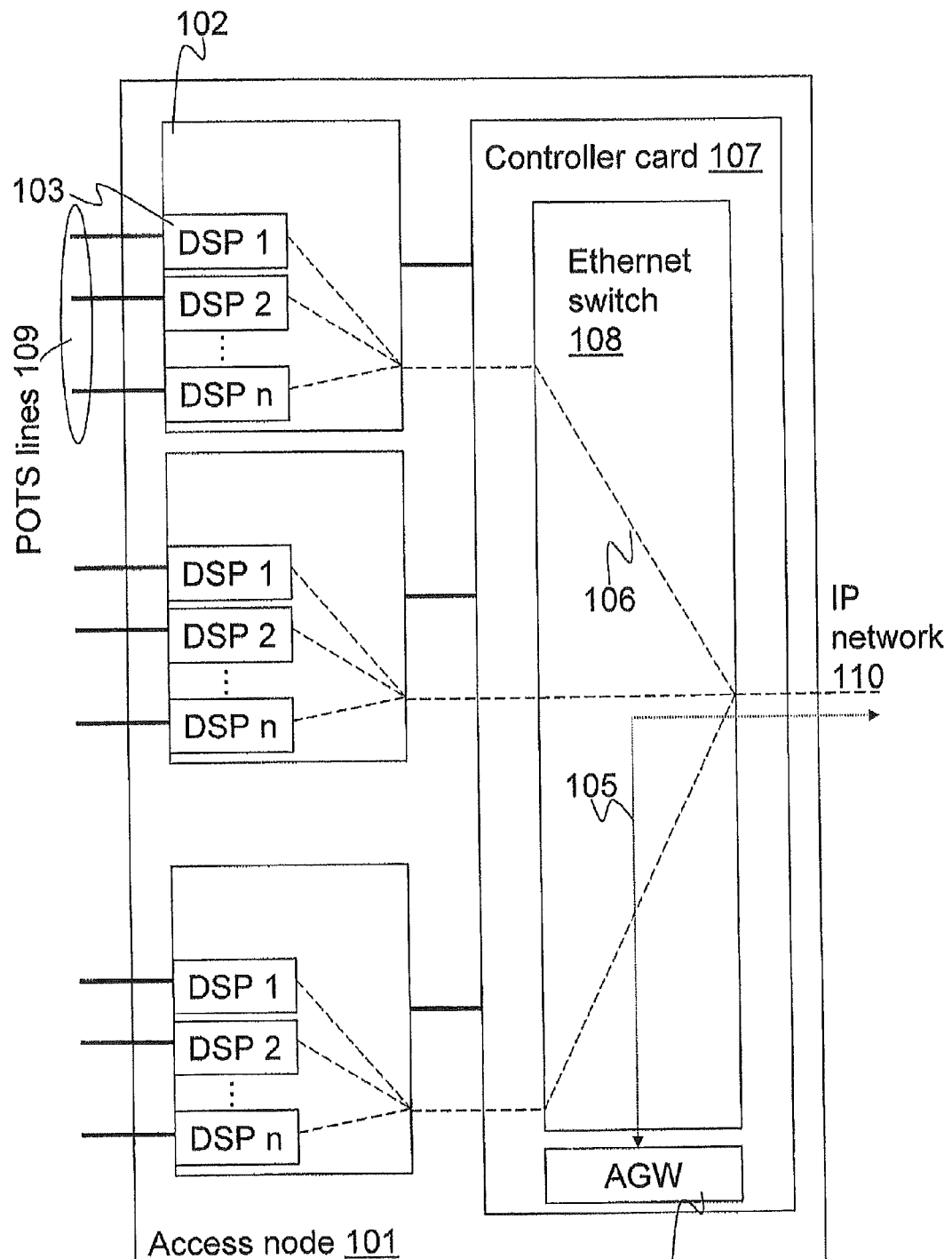
FIG. 2 illustrates schematically an access node with a centralized architecture wherein the present invention may be implemented.

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an Application Specific Integrated Circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention relates to methods and arrangements that enable the assignment of one common IP address to the whole RTP traffic of an access node instead of assigning one IP address per VoIP card as in a conventional access node. This is achieved by giving the VoIP cards a common MAC address and by using the destination UDP port number in a downstream RTP packet to identify the destination VoIP card, i.e. the VoIP card terminating the RTP packet and converting the digital signal back to analogue voice signals. An object is to minimize the number of public IP addresses needed for the VoIP service without increasing the cost of the access node.

The basic concept of the present invention is thus to assign one common IP address to all VoIP cards of an access node. This IP address is chosen amongst the public IP addresses and will hereinafter be referred to as IP[RTP]. The most common IP address today is a 32-bit number that identifies each sender or receiver of information sent in packets across the Internet. The Internet is an interconnection of many individual networks, and an IP address has two parts: the identifier of a particular network on the Internet and an identifier of the particular device or the so called host within that network. The IP address thus includes both a unique network number, and a host number which is unique within the network.

The machine or physical address used within a network may be different than the Internet's IP address. In a local area network (LAN) or other network, the MAC address is a device's (or IP host's) unique hardware number. On an Ethernet LAN, this is the same as the Ethernet address. A host in an Ethernet network can communicate with another host, only if it knows the MAC address of that host. When the host is connected to the Internet, a correspondence table, also called cache table, relates the IP address to the host's physical MAC address.

The Address Resolution Protocol (ARP) is the network protocol used to resolve an IP address to the corresponding MAC/Ethernet address. When the host needs to resolve a given IP address to a MAC address, it broadcasts an ARP request packet. The ARP request packet contains the source MAC address, the source IP address and the destination IP address. Each host in the local network receives this packet. The host with the specified destination IP address, sends an ARP reply packet to the originating host with its MAC address and IP address. As mentioned above, the ARP maintains the mapping between the IP address and the MAC address in the ARP cache table in a memory. The entries in this table are dynamically added and removed.

In the present invention, the VoIP cards of an access node are given a common MAC address that will be the destination MAC address in downstream RTP packets, and the source MAC address in upstream packets. This enables the assignment of one IP address, IP[RTP], to all VoIP cards in the access node. IP[RTP] will be the destination IP address in downstream packets, and the source IP address in upstream packets.

The controller card in the access node of the present invention, is not able to identify the destination of received downstream RTP packets based on the destination MAC address in the Ethernet header alone, since it is the same for all RTP packets. Instead, the UDP port number will be used to distinguish between the RTP streams, since a UDP port is uniquely assigned to each active call. The UDP port numbers are configured at call setup (i.e. during the signaling phase) on the relevant VoIP card. This is done by the AGW application using an internal Application Programming Interface (API). When the controller card receives a packet, the packet comprises the destination UDP port number which can then be used to identify the destination VoIP card for the packet. The destination VoIP card is also the VoIP card terminating the RTP packets and converting the pulse-code modulation samples back to analogue voice signals.

The identification of the destination VoIP card of downstream RTP packets, according to this invention, can be based on one of the two following mechanisms:

1. In a first embodiment, the controller card forwards the packet to all VoIP cards of the access node upon reception of an RTP packet. The actual identification of the destination of the packet is therefore done on each of the VoIP cards. Each of the VoIP cards will compare the destination UDP port number in the received packet with the UDP port numbers configured on the VoIP card, and will discard the received packet when there is no match between these UDP port numbers.

2. In an alternative second embodiment, an assignment of a UDP port number range to each VoIP card is required. The associations between VoIP card and UDP port number range are either configured on the controller card by a management system or hardcoded on the controller card using an algorithm based e.g. on the physical position of the VoIP card within the equipment. The UDP port number ranges for the different VoIP cards must not overlap. Upon reception of an RTP packet, the controller card will identify the destination VoIP card of the packet by comparing the destination UDP port number in the received packet with the configured port number ranges, and will forward the packet only to the VoIP card corresponding to a range that comprises the destination UDP port number.

The advantage of the first embodiment is that there is no need to configure any UDP port ranges for the VoIP cards on the controller card, as in the second embodiment. On the other hand, the second embodiment enables a reduced traffic on each VoIP card, as the packet is only forwarded to the relevant VoIP card. An advantage of the present invention according to any of the two embodiments is that it does not imply any hardware changes to implement.

There are alternative ways to choose the common MAC address given to the VoIP cards. In one embodiment of the present invention, the common MAC address of the VoIP cards is chosen to be the MAC address of the controller card. In this embodiment the IP address for the signaling traffic and the IP address for the RTP traffic can coincide, and if desired the access node may require only one single public IP address for both signaling and RTP traffic, thus reducing the number of IP addresses to a minimum.

In an alternative embodiment of the present invention, the common MAC address of the VoIP cards is a unique MAC address which is not the MAC address of the controller card. This MAC address may for example be created by using the same format as the Virtual MAC address described in U.S. 2004/0141468 A1. This ensures that the virtual MAC address will be unique within the network thus avoiding two access nodes with the same MAC address. The MAC address may also be a public unique MAC address. In this alternative embodiment, the IP address for the signaling traffic and the IP address for the RTP traffic, IP[RTP], are different, as it is not possible that one IP address corresponds to different MAC addresses.

As previously described, the ARP is used to resolve an IP address to the corresponding MAC address. This means that hosts in the IP network will from time to time broadcast ARP request messages. These ARP request messages will be received as downstream packets by among others the access node. Such a request message packet will be handled by the controller card of the access node. If the destination IP address of the ARP request message packet corresponds to IP[RTP], an ARP reply will be generated and forwarded to the relevant host in the IP network with the common IP address IP[RTP] and the common MAC address of the VoIP cards as source addresses. Internet Control Message Protocol (ICMP) messages that are used to send error messages, such as messages indicating that a requested service is unavailable, are handled in an analogue way by the controller card.

The access node will also handle upstream RTP packets. In the upstream, RTP packets are generated on the VoIP card corresponding to the local side of the VoIP call, with the source IP address being IP(RTP) and with the source MAC address being the common MAC address of the VoIP card. In the upstream direction, the RTP traffic is always forwarded to the Default Gateway in the IP network, even though the call occurs between two users connected to the same access node. The destination IP address of the generated packet is the IP address of the remote side of the call.

Conventionally, the Ethernet switch on the controller card bridges packets both in downstream towards the VoIP cards and in upstream towards the IP network. The packets are sent out on every port of the switch and will be accepted only by the intended destination node. However, there is a functionality in an Ethernet switch called "learning", which enables the switch to learn the MAC address on each port and to develop a learning table, in order for subsequent messages to be forwarded only to the destination port. In the present invention, upstream RTP packets generated on different VoIP cards, corresponding to different VoIP calls, will be forwarded to the Ethernet switch on the controller card. They will all have the same source MAC address, which is not allowed in a switch with learning functionality, so the learning must be disabled on the ports facing the VoIP cards.

During a conventional VoIP call setup signaling phase, the AGW application on the controller card will, via the API, inform the local VoIP card of the IP address and the UDP port number of the remote VoIP card. In one embodiment of the present invention, the signaling phase will, in addition to the previously described, also include the sending of an ARP request to the IP network to determine the MAC address of the remote side. This makes it possible to include the MAC address, together with the IP address and the UDP port number of the remote VoIP card, in the API message to the local VoIP card. In this embodiment, ICMP messages are sent when needed (not necessarily during the signaling phase) by the controller card towards the IP network.

In an alternative embodiment, an ARP request message will be transmitted to the controller card by the VoIP card, before the VoIP card generates the first RTP packet of the call in the very beginning of the speech phase. The controller card will not forward the ARP request, but will generate an own request and send it to the IP network. When the corresponding ARP reply message is received by the controller card, the controller card can transmit the MAC address of the remote side to the local VoIP card via an API message. A similar mechanism is implemented on the controller card to handle any ICMP message coming from the VoIP cards.

In the following the above embodiments will be further explained with reference to FIGS. 3a-d and 4a-b.

Figure 3A:
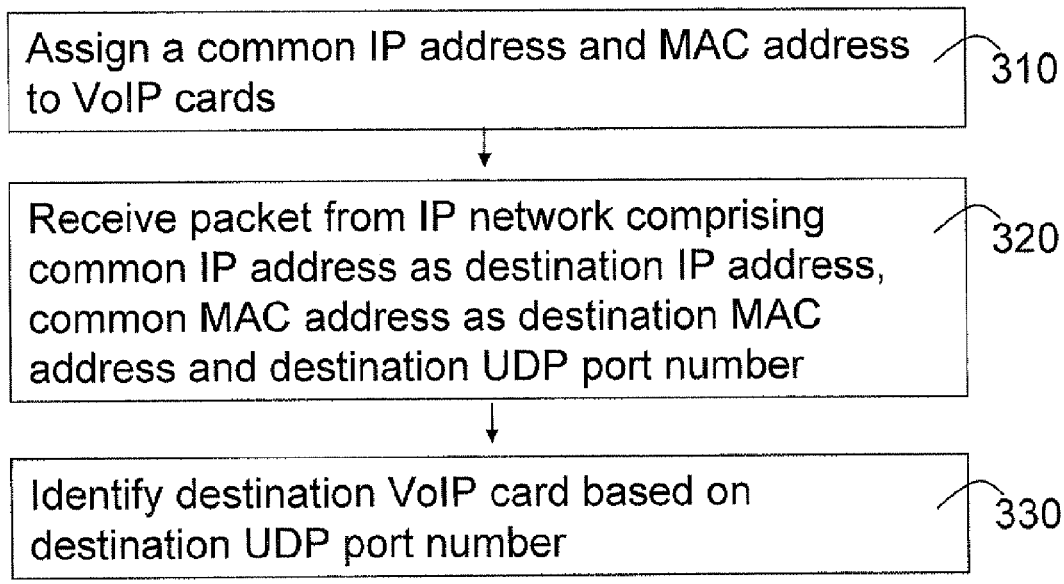
FIGS. 3a-d are flowcharts of the methods of the access node according to embodiments of the present invention.

FIG. 3a is a flowchart of the method in an access node for handling downstream RTP packets associated with an ongoing VoIP call of the present invention. The VoIP card which is the destination of the downstream packets of this VoIP call, has been configured with the UDP port number that is to be used for this call in the signaling phase of the call setup. Other UDP ports may be configured on this same VoIP card, since the card may handle other VoIP calls as well. In step 310, the VoIP cards of the access node are assigned a common IP address as well as a common MAC address for the RTP packets. A packet is received by the access node from the IP network, in step 320. The packet comprises the common IP address as the destination IP address, the common MAC address as the destination MAC address and a destination UDP port number. Since all VoIP cards are assigned the same IP address and MAC address for RTP packets, it is not possible to use these addresses to identify the destination VoIP card for this packet. Therefore, in step 330, the destination UDP port number is used to identify the VoIP card that is the destination of the packet and thus the VoIP card terminating the packet and converting the samples to analogue voice signals.

Figure 3B:
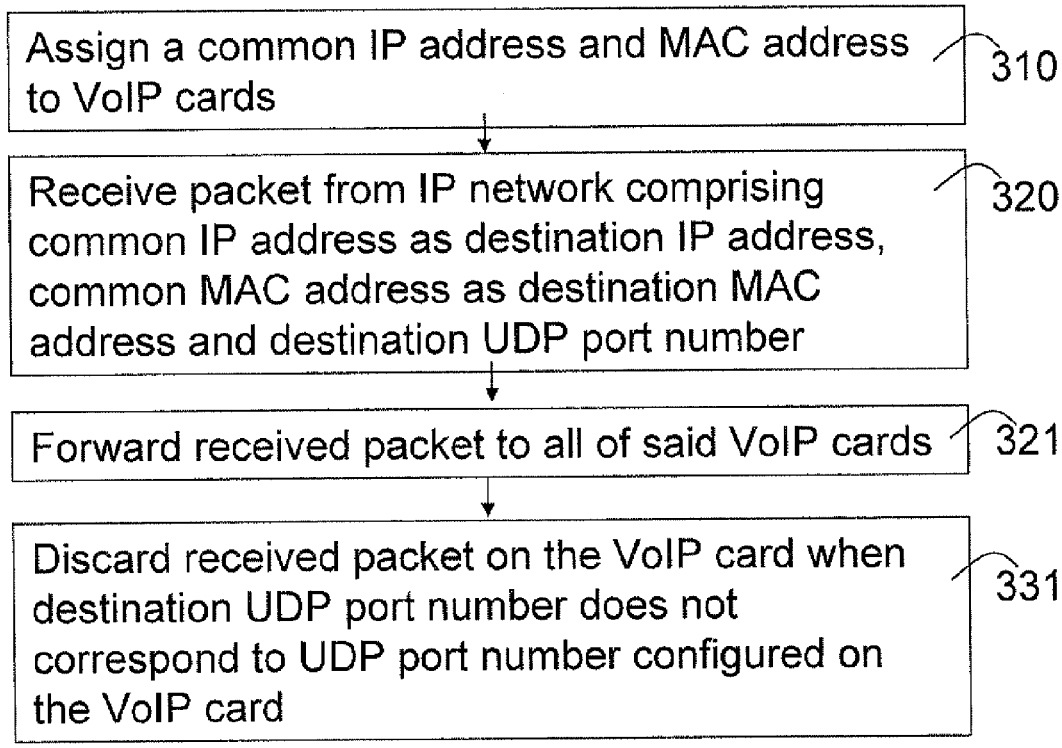

FIG. 3b is a flowchart of the method in the access node for handling downstream RTP packets associated with an ongoing VoIP call, according to the first embodiment of the present invention described above. Step 310 is the same as described above. The VoIP cards of the access node are assigned a common IP address and a common MAC address for RTP packets. In step 320, the packet is received and is then, in step 321, forwarded to all the VoIP cards of the access node. The step of identifying the destination VoIP card is then performed by each one of the VoIP cards to which the packet has been forwarded, in step 331, by discarding the received packet when the destination UDP port number of the packet does not correspond to any of the UDP port numbers configured on the VoIP card.

Figure 3C:
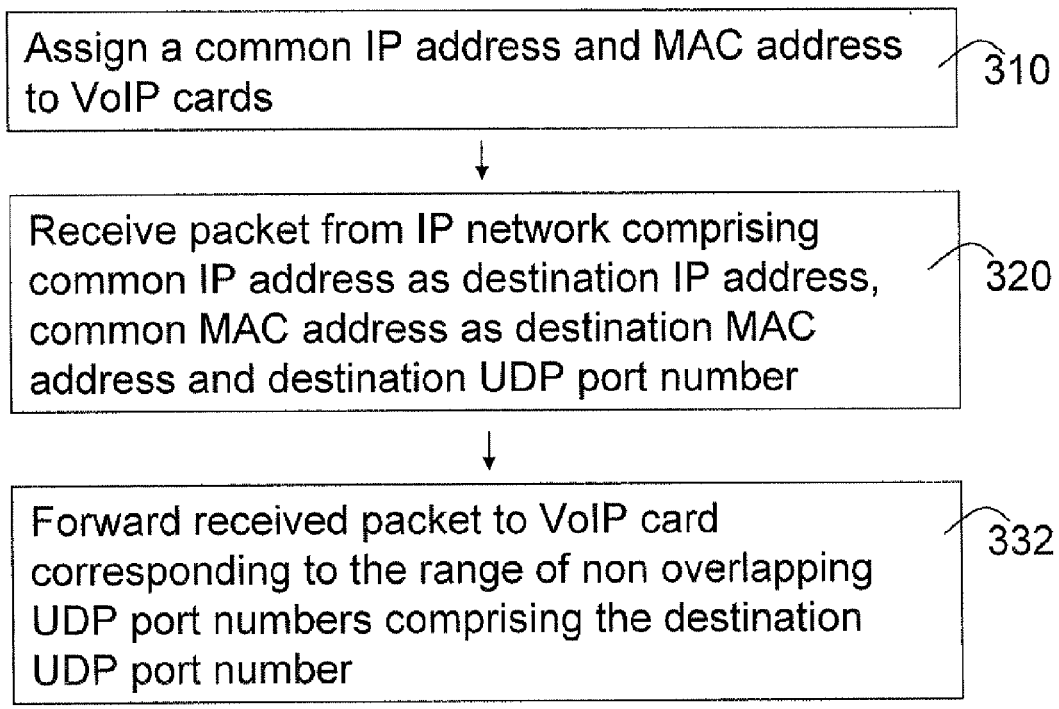

FIG. 3c is a flowchart of the method in the access node for handling downstream RTP packets associated with an ongoing VoIP call, according to the second embodiment of the present invention described above. Also here, step 310 is the same as described above. The VoIP cards of the access node are assigned a common IP address and a common MAC address for RTP packets. In this second embodiment, the controller card has been configured with a range of UDP port numbers valid for each of the connected VoIP cards. In step 320, the packet is received by the controller card in the access node, and the controller card can then, in step 332, identify the destination VoIP card by forwarding the packet to the VoIP card that has a UDP port number range that comprises the destination UDP port number of the packet.

Figure 3D:
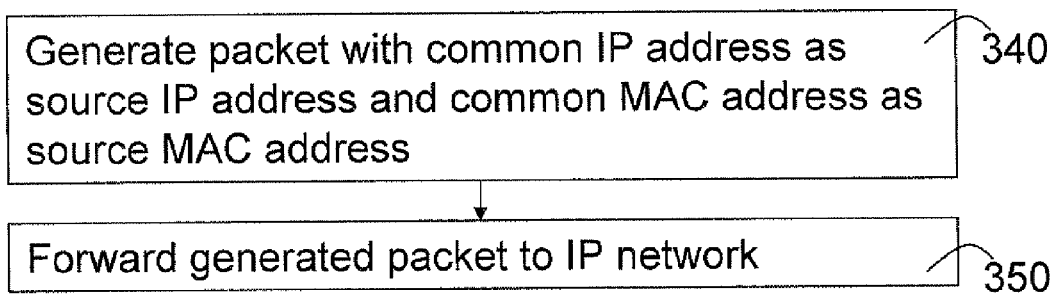

The method in the access node for handling upstream RTP packets associated with a VoIP call is illustrated in FIG. 3d. The VoIP cards of the access node have been assigned a common IP address and a common MAC address for RTP packets, which means that the originating VoIP card for the VoIP call will, in step 340, generate an RTP packet with the common IP address as the source IP address and the common MAC address as the source MAC address. This generated packet will then, in step 350, be forwarded to the IP network.

Figure 4A:
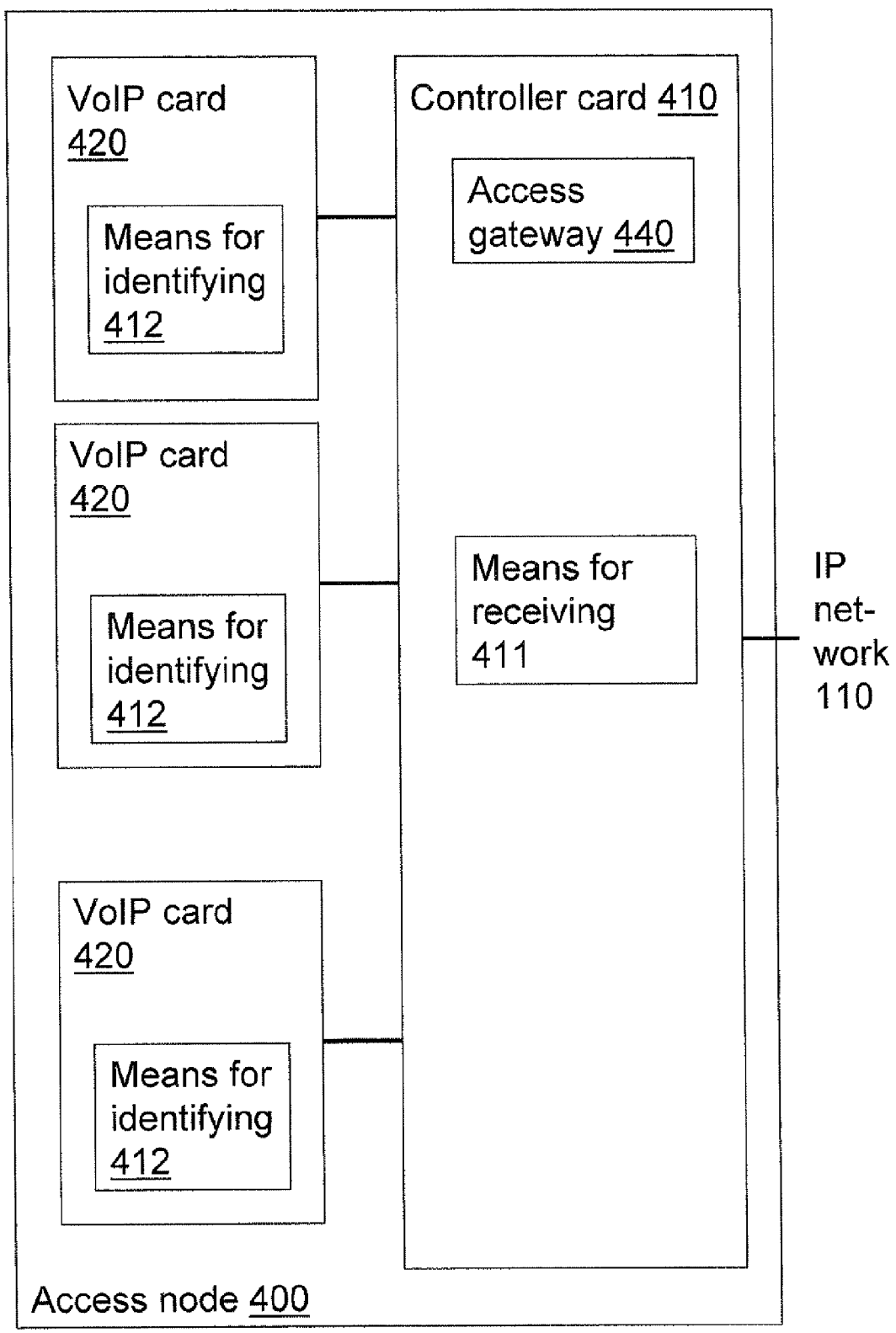
FIGS. 4a-b illustrate schematically an access node according to embodiments of the present invention.

Schematically illustrated in FIG. 4a and according to the first embodiment described above, the access node 400 comprises a controller card 410 connected to an IP network 110, and a number of VoIP cards 420 which are assigned a common IP address and a common MAC address to be used for RTP packets. One of the VoIP cards 420 of the access node is the destination VoIP card for the ongoing call, i.e. the VoIP card converting the pulse-code modulated symbols back to analogue voice signals. This destination VoIP card is configured with a UDP port number by the AGW application 440 at call setup. The controller card comprises means for receiving 411 the packet from the IP network. The packet comprises the common IP address as destination IP address, the common MAC address as destination MAC address and a destination UDP port. The means for receiving 411 are arranged to forward the packet to all of the VoIP cards. Each VoIP card 420 comprises means for identifying 412 the destination VoIP card by discarding the packet when the destination UDP port number does not correspond to a UDP port number configured on the VoIP card. It is thus only the relevant VoIP card that will keep the packet, and convert the content to analogue voice signals.

Figure 4B:
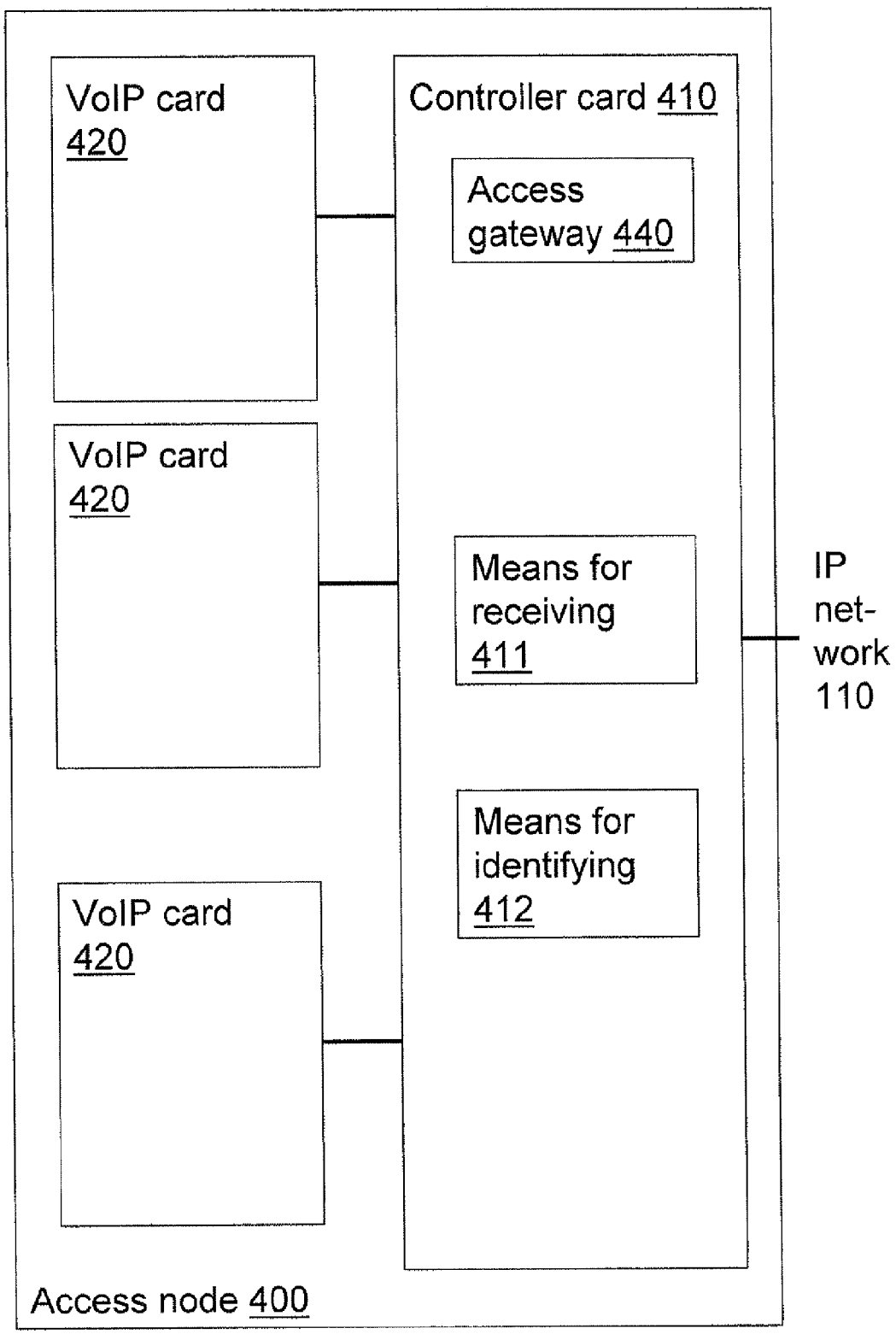

Schematically illustrated in FIG. 4b and according to the second embodiment described above, the access node 400 comprises a controller card 410 connected to an IP network 110, and a number of VoIP cards 420 which are assigned a common IP address and a common MAC address for RTP packets. One of the VoIP cards is the destination VoIP card for the ongoing call and is configured with a UDP port number by the AGW application 440 at call setup. The controller card has been configured with a range of non overlapping UDP port numbers for each of the VoIP cards, by for example a management system. The controller card comprises means for receiving 411 the packet from the IP network, and the packet comprises the common IP address as destination IP address, the common MAC address as destination MAC address, and a destination UDP port. The controller card also comprises means for identifying 412 the destination VoIP card by forwarding the received packet to the VoIP card corresponding to the range of UDP port numbers that comprises the destination UDP port number. The packet is thus only forwarded to one relevant VoIP card which will convert the content of the packet to analogue voice signals.

It should be noted that the means illustrated in FIG. 4a-b may be implemented by physical or logical entities using software functioning in conjunction with a programmed microprocessor or general purpose computer, and/or using an Application Specific Integrated Circuit (ASIC).

The above mentioned and described embodiments are only given as examples and should not be limiting to the present invention. Other solutions, uses, objectives, and functions within the scope of the invention as claimed in the accompanying patent claims should be apparent for the person skilled in the art.

ABBREVIATIONS

AGW Access GateWay
API Application Programming Interface
ARP Address Resolution Protocol
ASIC Application Specific Integrated Circuit
DSP Digital Signal Processors
ICMP Internet Control Message Protocol
IP Internet Protocol
LAN Local Area Network
MAC Media Access Control
NAT Network Address Translation
POTS Plain Old Telephony Service
PSTN Public Switched Telephone Network
RTP Real-time Transport Protocol
SIP Session Initiation Protocol
UDP User Datagram Protocol
VoIP Voice over IP

The invention claimed is:

1. An access node configured to handle downstream Real-Time Transport Protocol (RTP) packets associated with an ongoing VoIP call, the access node comprising:
a controller card connectable to an IP network;
a first and at least one additional VoIP card connectable to the controller card and each of the VoIP cards being configured to terminate an analog Plain Old Telephone Service (POTS) line, wherein the first VoIP card is the destination of the RTP packets and is configured with at least one User Datagram Protocol (UDP) port number, the VoIP cards are assigned a common IP address and a common MAC address for the RTP packets;
wherein the controller card is configure to receive an RTP packet from the IP network, the RTP packet comprising the common IP address as a destination IP address, the common MAC address as a destination MAC address and a destination UDP port number;
wherein the VoIP cards share the common IP address and the common MAC address and are each configured to operate in an active mode for processing the RTP packets based on destination UDP port numbers associated with the RTP packets; and
wherein the UDP port number identifies the first VoIP card among the VoIP cards.

2. The access node according to claim 1, wherein the controller card comprises an access gateway application to configure the first VoIP card with the destination UDP port number during setup of the VoIP call.

3. The access node according to claim 1, wherein the controller card is further configured to forward the received RTP packet to all of the VoIP cards, and wherein the VoIP cards are configured to discard the received RTP packet when the destination UDP port number of the RTP packet does not correspond to a UDP port number configured on the VoIP card.

4. The access node according to claim 1, wherein the controller card is configured with a range of non overlapping UDP port numbers for each of the VoIP cards, and wherein the controller card is further configured to forward the received RTP packet to the first VoIP card, which corresponds to a range of non overlapping UDP port numbers comprising the destination UDP port number of the received RTP packet.

5. The access node according to claim 1, wherein the common MAC address is a MAC address of the controller card.

6. The access node according to claim 1, wherein the common MAC address is a unique MAC address.

7. The access node according to claim 1, wherein the controller card is further operable to reply to all ARP request messages or ICMP messages received from the IP network.

8. The access node according to claim 1, further configured to handle upstream RTP packets associated with an ongoing VoIP call, wherein the first VoIP card is operable to generate an RTP packet comprising the common IP address as a source IP address and the common MAC address as a source MAC address, and to forward the generated RTP packet to the IP network.

9. The access node according to claim 8, wherein the generated RTP packet further comprises a destination MAC address configured on the first VoIP card during setup of the VoIP call.

10. The access node according to claim 8, wherein the generated RTP packet further comprises a destination MAC address provided by the controller card using Address Resolution Protocol (ARP).

11. The access node according to claim 1, wherein the controller card is further operable to handle all Internet Control Message Protocol (ICMP) messages towards the IP network.

12. A method in an access node for handling downstream RTP packets associated with an ongoing VoIP call, the access node comprising a controller card connected to an IP network, and a first and at least one additional VoIP card connected to the controller card, wherein the first VoIP card is a destination of the RTP packets, and is configured with at least one UDP port number, the method comprising:
assigning a common IP address and a common MAC address for the RTP packets to the VoIP cards, each of the VoIP cards being configured to terminate an analog Plain Old Telephone Service (POTS) line;
receiving an RTP packet from the IP network, the RTP packet comprising the common IP address as a destination IP address, the common MAC address as a destination MAC address and a destination UDP port number; and
identifying a destination VoIP card based only on the destination UDP port number;
wherein the VoIP cards are each configured to operate in an active mode for processing the RTP packets based on destination UDP port numbers associated with the RTP packets.

13. The method according to claim 12, wherein the first VoIP card is configured with the destination UDP port number during setup of the VoIP call by an access gateway application on the controller card.

14. The method according to claim 12, wherein the receiving of the RTP packet also comprises forwarding the received RTP packet to all of the VoIP cards, and wherein the identifying of the destination VoIP card is performed by each of the VoIP cards by discarding the received RTP packet when the destination UDP port number of the RTP packet does not correspond to a UDP port number configured on the VoIP card.

15. The method according to claim 12, wherein the controller card is configured with a range of non overlapping UDP port numbers for each of the VoIP cards, and wherein the identifying of the destination VoIP card is performed by the controller card by forwarding the received RTP packet to a VoIP card corresponding to the range of non overlapping UDP port numbers comprising the destination UDP port number of the RTP packet.

16. The method according to claim 12, wherein the common MAC address is a MAC address of the controller card.

17. The method according to claim 12, wherein the common MAC address is a unique MAC address.

18. The method according to claim 12, wherein the controller card is operable to reply to all ARP request messages or ICMP messages received from the IP network.

19. A method in an access node for handling upstream RTP packets associated with an ongoing VoIP call, the access node comprising a controller card connected to an IP network, and a first and at least one additional VoIP card connected to the controller card, the first VoIP card being the origin of the RTP packets, the method comprising the following performed by the first VoIP card:

generating an RTP packet comprising the common IP address as a source IP address and the common MAC address as a source MAC address; and forwarding the generated RTP packet to the IP network;

wherein the VoIP cards share the common IP address and the common MAC address for the RTP packets and are each configured to operate in an active mode for processing the RTP packets based on User Datagram Protocol (UDP) port numbers associated with the RTP packets and wherein the UDP port number identifies the first VoIP card among the VoIP cards; and wherein each of the VoIP cards is configured to terminate an analog Plain Old Telephone Service (POTS) line.

20. The method according to claim 19, wherein the common MAC address is a MAC address of the controller card.

21. The method according to claim 19, wherein the common MAC address is a unique MAC address.

22. The method according to claim 19, wherein the generated RTP packet further comprises a destination MAC address configured on the first VoIP card during setup of the VoIP call.

23. The method according to claim 19, wherein the generated RTP packet further comprises a destination MAC address provided by the controller card using ARP.

24. The method according to claim 19, wherein the controller card is operable to handle all ICMP messages towards the IP network.

\* \* \* \* \*